United States Patent
Alacqua et al.

(10) Patent No.: US 9,512,829 B2
(45) Date of Patent: Dec. 6, 2016

(54) SHAPE MEMORY ACTUATOR WITH MULTISTABLE DRIVEN ELEMENT

(71) Applicant: SAES GETTERS S.P.A., Lainate (IT)

(72) Inventors: Stefano Alacqua, Como (IT);
Francesco Butera, Como (IT); Matteo Mazzoni, Montedivalli (IT)

(73) Assignee: SAES GETTERS S.P.A., Lainate (MI) (IT)

( * ) Notice: Subject to any disclaimer, the term of this patent is extended or adjusted under 35 U.S.C. 154(b) by 0 days.

(21) Appl. No.: 14/780,466

(22) PCT Filed: Mar. 21, 2014

(86) PCT No.: PCT/IB2014/060037
§ 371 (c)(1),
(2) Date: Sep. 25, 2015

(87) PCT Pub. No.: WO2014/162234
PCT Pub. Date: Oct. 9, 2014

(65) Prior Publication Data
US 2016/0047363 A1 Feb. 18, 2016

(30) Foreign Application Priority Data

Apr. 5, 2013 (IT) .............................. MI2013A0512

(51) Int. Cl.
| | |
|---|---|
| *F03G 7/06* | (2006.01) |
| *F16K 31/02* | (2006.01) |
| *F16K 31/44* | (2006.01) |

(52) U.S. Cl.
CPC ............. *F03G 7/065* (2013.01); *F16K 31/025* (2013.01); *F16K 31/44* (2013.01)

(58) Field of Classification Search
USPC ............................... 251/11; 60/527, 528, 529
See application file for complete search history.

(56) References Cited

U.S. PATENT DOCUMENTS

| | | | | |
|---|---|---|---|---|
| 2,212,762 A | * | 8/1940 | Wittmann | ............. H01F 7/1638 |
| | | | | 137/487.5 |
| 4,887,430 A | * | 12/1989 | Kroll | ....................... F03G 7/065 |
| | | | | 337/140 |

(Continued)

FOREIGN PATENT DOCUMENTS

EP     1241351     9/2002

OTHER PUBLICATIONS

PCT International Search Report issued for PCT/IB2014/060037 filed on Mar. 21, 2014 in the name of SAES GETTERS S.P.A. mail date: Nov. 10, 2014.

(Continued)

*Primary Examiner* — Mary McManmon
*Assistant Examiner* — Jonathan Waddy
(74) *Attorney, Agent, or Firm* — Steinfl & Bruno LLP

(57) ABSTRACT

A shape memory actuator is described. The shape memory actuator has a supporting body, a driven element slidably mounted on the supporting body for movement between a stable rest position and a stable operative position, a driving element that drives the driven element, the movement of the driving element being determined by a SMA wire and by first resilient return means acting to return the driving element to the rest position upon deactivation of the SMA wire, second resilient return means acting on the driven element in opposition to the SMA wire, engaging means suitable to achieve at the operative position a reversible engagement between the driven element and the supporting body, either directly or indirectly, said engagement being able to resist the action of second resilient return means, and a control system for the engagement and disengagement of the engaging means.

18 Claims, 5 Drawing Sheets

(56) References Cited

U.S. PATENT DOCUMENTS

| | | | | |
|---|---|---|---|---|
| 5,129,753 A | * | 7/1992 | Wesley | B64G 1/222 |
| | | | | 403/322.3 |
| 5,176,544 A | * | 1/1993 | AbuJudom, II | F03G 7/065 |
| | | | | 236/101 D |
| 6,840,257 B2 | | 1/2005 | Dario et al. | |
| 6,843,465 B1 | | 1/2005 | Scott | |
| 7,055,793 B2 | | 6/2006 | Biehl et al. | |
| 8,056,335 B1 | * | 11/2011 | Brown | F03G 7/065 |
| | | | | 60/528 |
| 2005/0005980 A1 | | 1/2005 | Eberhardt et al. | |
| 2007/0028964 A1 | * | 2/2007 | Vasquez | F03G 7/065 |
| | | | | 137/457 |
| 2008/0022674 A1 | * | 1/2008 | Brown | F03G 7/065 |
| | | | | 60/527 |
| 2012/0151913 A1 | | 6/2012 | Foshansky | |
| 2012/0187143 A1 | * | 7/2012 | Weber | B65D 43/164 |
| | | | | 221/112 |
| 2013/0011806 A1 | * | 1/2013 | Gao | F03G 7/065 |
| | | | | 432/37 |

OTHER PUBLICATIONS

PCT Written Opinion issued for PCT/IB2014/060037 filed on Mar. 21, 2014 in the name of SAES GETTERS S.P.A. mail date: Nov. 10, 2014.

PCT International Preliminary Report on Patentability issued for PCT/IB2014/060037 filed on Mar. 21, 2014 in the name of SAES GETTERS S.P.A. mail date: Sep. 3, 2015.

\* cited by examiner

SHAPE MEMORY ACTUATOR WITH MULTISTABLE DRIVEN ELEMENT

CROSS REFERENCE TO RELATED APPLICATIONS

The present application is the U.S. National Stage of International Patent Application PCT/IB2014/060037 filed on Mar. 21, 2014 which, in turn, claims priority to Italian Application No. MI2013A000512 filed on Apr. 5, 2013, which is incorporated herein by reference in its entirety.

BACKGROUND OF THE INVENTION

The present invention relates to shape memory actuators, i.e. actuators in which the actuating member consists of an element (for example a wire element) made from a shape memory alloy (indicated in the following as "SMA"), and in particular to an actuator in which the driven element is multistable, preferably bistable, i.e. it is moved by a driving element between at least two stable positions. Although specific reference is made in the following to the use of a wire as actuating member, it should be noted that what is being said also applies to other similar elongated shapes, i.e. with a dimension much greater than the other two dimensions which are generally very small, e.g. strips and the like.

It is known that the shape memory phenomenon consists in the fact that a mechanical piece made of an alloy that exhibits said phenomenon is capable of transitioning, upon a temperature change, between two shapes that are preset at the time of manufacturing, in a very short time and without intermediate equilibrium positions. A first mode in which the phenomenon may occur is called "one-way" in that the mechanical piece can change shape in a single direction upon the temperature change, e.g. passing from shape A to shape B, whereas the reverse transition from shape B to shape A requires the application of a mechanical force.

On the contrary, in the so-called "two-way" mode both transitions can be caused by temperature changes, this being the case of the application of the present invention. This occurs thanks to the transformation of the micro-crystalline structure of the piece that passes from a type called martensitic (M), stable at lower temperatures, to a type called austenitic (A), stable at higher temperatures, and vice versa (M/A and A/M transition).

A SMA wire has to be trained so that it can exhibit its features of shape memory element, and the training process of a SMA wire usually allows to induce in a highly repeatable manner a martensite/austenite (M/A) phase transition when the wire is heated and to induce an austenite/martensite (A/M) phase transition when the wire is cooled. In the M/A transition the wire undergoes a shortening by 3-5% which is recovered when the wire cools down and through the A/M transition returns to its original length.

This characteristic of SMA wires to contract upon heating and then to re-extend upon cooling has been exploited since a long time to obtain actuators that are very reliable and silent. In particular, this type of actuator is used in some valves to perform the movement of the shutter from a first stable position of closed valve to a second stable position of open valve, or to multiple stable positions of partially open valve, and vice versa.

Examples of valves with SMA actuators can be found in U.S. Pat. No. 6,840,257, U.S. Pat. No. 6,843,465, U.S. Pat. No. 7,055,793, U.S. 2005/0005980 and U.S. 2012/0151913. All these prior art documents disclose actuators that are quite complicated, bulky and rather expensive, usually involving the use of two SMA wires and/or mechanical stabilization elements such as a diaphragm for moving the shutter between the two (or more) stable positions. These types of known SMA actuators are therefore unsuitable to be scaled down in size and not fully reliable when used in harsh environments due their rather delicate and sophisticated operation.

SMA actuators are used also in a variety of other devices in which their operation is quite different from the two-way operation mentioned above.

U.S. 2007/0028964 discloses a resettable bi-stable thermal control valve that closes when fluid conducted therethrough reaches a predetermined temperature, so as to act as over temperature shut-off valve. More specifically, the reaching of the threshold temperature causes a SMA wire to contract and exert a force on an inner piston body to move into a piston cap compressing an inner piston spring, until two apertures provided through sidewalls of the piston cap become aligned with cavities formed in the piston body thus allowing corresponding balls to move from the outer surface of the piston body into said cavities, which in turn permits a shutter-carrying member that was previously blocked by said balls to retract into the valve body under the force of a spring.

This operation of the SMA wire causes an irreversible closure of the valve since the balls in the cavities are prevented by the shutter-carrying member from recovering their original position under the action of the inner piston spring even after deactivation of the SMA wire. This valve is therefore merely a safety device in which the SMA actuator is used only as a release mechanism, and such a device must be reset manually by pulling out the shutter-carrying member against the resistance of its spring until the apertures in the piston cap are cleared, such that the balls can recover their original position when the inner piston body moves out of the inner piston cap under the force of the compressed inner piston spring.

A similar use of a SMA actuator as a release mechanism is also disclosed in U.S. 2012/0187143 wherein a SMA wire is used to disengage the latch of a spring-loaded lid which is then re-closed manually. In this case the tension on the SMA wire is provided by two spring-loaded rotating levers that engage the wire through a capstan and a plunger.

Still another use of a SMA actuator as a release mechanism is disclosed in U.S. 2008/002674 wherein a SMA wire is used to disengage the latch of a door or trunk and a mechanism is provided to make use of the user's force in closing the door or trunk to restore the martensitic state of the SMA wire through a stress-induced state change in case the ambient temperature is so high that the SMA wire does not cool to the martensite transition temperature upon deactivation.

BRIEF SUMMARY OF THE INVENTION

Therefore the object of the present invention is to provide a shape memory actuator which overcomes the above-mentioned drawbacks. This object is achieved by means of a shape memory actuator in which the driving element acted on by the SMA wire returns to its rest position upon deactivation of the SMA wire due to first resilient means, while the driven element stably remains in the operative position thanks to a reversible engagement with the supporting body and is then released from said engagement by a control system to return to its rest position due to second resilient means. Other advantageous features are disclosed in the dependent claims.

A first advantage of the actuator according to the invention stems from the fact that the driven element is moved between two (or more) stable positions without requiring any extra-stroke of the driving element. This results in the SMA wire being sized precisely for the required stroke of the driven element thus minimizing its cost and bulkiness.

A second significant advantage of this actuator is its capacity of using a single SMA wire to move the driven element between two (or more) stable positions, thus dispensing with the second SMA wire usually employed in prior art actuators. Also this factor, obviously, contributes to minimizing the cost and bulkiness of the actuator.

Another advantage of the present actuator, in two specific embodiments thereof, resides in the fact that the control system releases the driven element from the operative position without activating the SMA wire, which therefore enjoys a longer operational life since it is activated only every other actuation cycle.

Still another advantage of the subject actuator derives from its simple and robust structure, which makes it reliable, inexpensive and suitable also for operation in harsh environments.

BRIEF DESCRIPTION OF THE SEVERAL VIEW OF THE DRAWINGS

These and other advantages and characteristics of the shape memory actuator according to the present invention will be clear to those skilled in the art from the following detailed description of some non-limiting embodiments thereof, with reference to the annexed drawings wherein.

In all the drawings above the technical elements of the actuator have been simplified and represented in order to improve the understanding thereof in their constituting mechanical parts. Alternative solutions in the engineering sector or geometrical changes/variations of each represented mechanical element during the operative conditions of the actuator will be clearly deducible by a person skilled in the art.

DETAILED DESCRIPTION OF THE INVENTION

Figure 2:
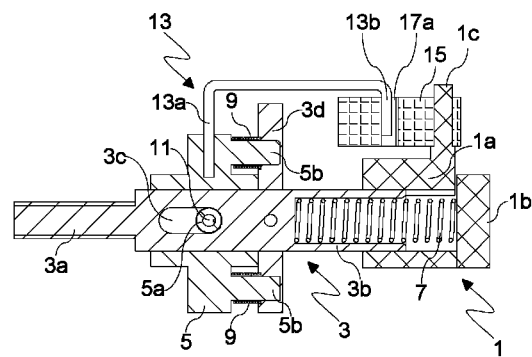
FIG. 2 is a vertical sectional view of the actuator of FIG. 1, taken along the central plane A-A.
Figure 1:
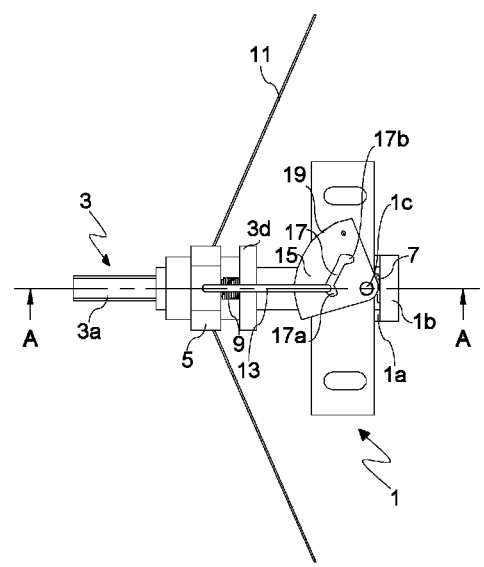
FIG. 1 is a diagrammatic top plan view of the main elements of a first embodiment of the present actuator, in a starting position defined as rest position.

With reference to FIGS. 1 and 2, there is seen that an actuator according to the present invention includes a supporting body 1 that carries all the other components through suitable seats and couplings, these being different depending on the specific technical solutions adopted for the intended purpose of the actuator. In the particular embodiment illustrated in detail hereunder, the supporting body 1 is provided with a longitudinal guide 1a, closed at one end by an abutment 1b, that slidably receives at the other end a horizontal shutter-carrier 3 which in turn slidably and coaxially carries a slider 5. The shutter-carrier 3 includes a threaded shaft 3a at a rear end, where a valve shutter can be mounted, an axial seat 3b at a front end, where a coil spring 7 is received, a longitudinally extending horizontal slot 3c at a middle portion, where a transverse sleeve 5a of slider 5 is slidably received, and a vertical disk 3d located between seat 3b and slot 3c. Two compressed coil springs 9 are arranged at diametrically opposite positions between shutter-carrier 3 and slider 5, although even a single spring could be used, said springs 9 being located on pegs 5b that project from the front side of slider 5 and enter corresponding seats formed in the rear side of shutter-carrier 3.

A horizontal SMA wire 11 passes through the transverse sleeve 5a and reaches end fixing points (not shown) provided on the supporting body 1, where it is secured by locking members that preferably also provide the electrical supply and the connection to an electronic control unit that controls the activation and deactivation of the SMA wire 11. In addition, most preferably, a coiled spring is coaxially arranged on the SMA wire 11 at an end portion thereof so that it can be compressed against the adjacent locking member upon contraction of the SMA wire 11. This spring serves as a mechanical safety in case shutter-carrier 3 and/or slider 5 cannot be moved for any reason, whereby the contraction of the SMA wire 11 would result in the rupture thereof because the shortening of the wire cannot be turned into a shortening of the path between the two locking members. Obviously, the strength of said spring is selected such that in normal operation it remains uncompressed upon contraction of the SMA wire 11 thus causing the horizontal sliding of slider 5.

A connecting member in the form of a substantially inverted U-shaped bridge 13 extends from the top of slider 5 to connect the latter with a rotating member 15 that rotates horizontally around a vertical pivot 1c extending from the top of the longitudinal guide 1a, preferably in the central plane A-A of the actuator. More specifically, bridge 13 has a first end 13a pivotally mounted on slider 5 with a vertical pivoting axis and a second end 13b slidably engaged in a slot 17 formed in the rotating member 15 and shaped such that its ends 17a, 17b are always located on opposite sides of pivot 1c in the horizontal plane throughout the rotational stroke of the rotating member 15. Slot 17 is substantially shaped like a square bracket with the short end sides oriented outwards a bit more than 90° to facilitate the entry and exit of the bridge end 13b into and from the slot ends 17a, 17b.

In this exemplary embodiment, in particular, the rotating member 15 is shaped like a circular sector and slot 17 extends to the left of the central plane A-A (considering abutment 1b as the front of the actuator) when in the rest position illustrated in these figures the second bridge end 13b is in the corner facing the first slot end 17a. It should be noted that, although it cannot be appreciated from the drawings, in this position the second bridge end 13b is not aligned with the first bridge end 13a and with pivot 1c, which are preferably coplanar with the central plane A-A, but is rather a little to the right with respect to them whereby bridge 13 is oriented a few degrees (e.g. 3°-5° to the right of pivot 1c for the reason that will be clear in the following. A permanent magnet 19 is secured on the curved vertical side of the rotating member 15 next to the second slot end 17b.

In the light of the description above, and referring also to FIGS. 3 to 8, the simple and effective operation of the shape memory actuator according to the present invention is readily understood. It should be noted that although the illustrated embodiment refers to the simplest case, i.e. a bistable driven element, some simple modifications within reach of a person skilled in the art could be made to obtain a multistable driven element that can take three or more stable positions, with particular reference to the possibility to a multistable driven element working with a Pulse Width Modulated (PWM) control signal, and some suggestions to this end are mentioned further on.

The rest position illustrated in FIGS. 1 and 2 is considered as the starting position, with the SMA wire 11 in the extended condition, the shutter-carrier 3 pushed back by spring 7 such that the front end of slot 3c abuts against the transverse sleeve 5a and slider 5 that cannot move further back due to bridge 13 that connects it to the rotating member 15 where the second bridge end 13b rests in the rearmost corner of slot 17, slightly to the right of pivot 1c as explained above.

Figure 4:
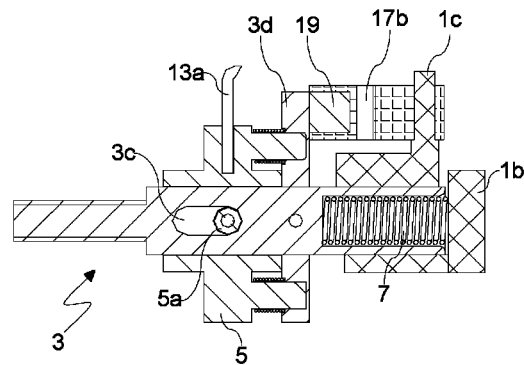
FIG. 4 is a vertical sectional view of the actuator of FIG. 3, taken along the central plane A-A.

The contraction of the SMA wire 11 in this position, typically by passing a current through it, causes the forward sliding of slider 5, and therefore also of shutter-carrier 3 and bridge 13. Such a movement results in the compression of spring 7 against abutment 1b and in the counter-clockwise rotation (as seen from above in FIG. 3) of the rotating member 15 around pivot 1c due to the push of the second bridge end 13b that engages the first slot end 17a thanks to the initial orientation of bridge 13. This rotation brings magnet 19 into contact with disk 3d, as shown in FIG. 4, which is either ferromagnetic or includes a properly located ferromagnetic portion (or even a magnetic portion of opposite polarization) that is engaged by magnet 19. In this way, a reversible magnetic engagement is achieved that is strong enough to resist the force of return spring 7 once the SMA wire 11 is deactivated and thus begins to re-extend.

The deactivation of the SMA wire 11 can be determined on the basis of a pre-set activation time, but is preferably determined by sensor means suitable to detect the engagement condition of the engaging means so as to obtain a positive feedback on the stability of the reached operative position. In this respect, the use of magnetic engaging means allows to exploit magnetic sensor means, such as a Hall effect sensor or switch or the like, to detect the engagement condition. In any case, obviously, it is possible to use other types of sensor means such as mechanical (e.g. microswitch), optical (e.g. photo-detector) or electrical (e.g. potentiometer).

Figure 3:
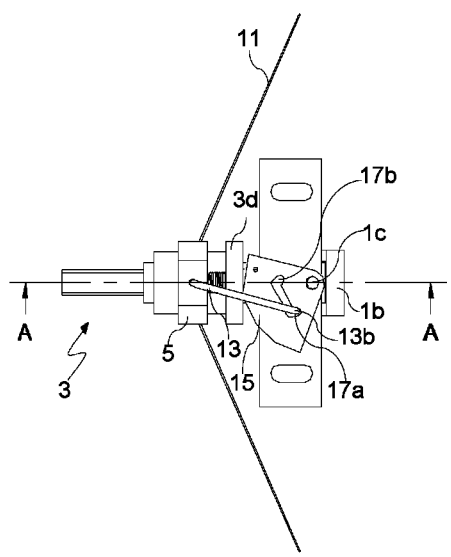
FIG. 3 is a view similar to FIG. 1 of the same actuator at an intermediate moment of a first actuation cycle, with both the driving element and the driven element in an operative position.
Figure 6:
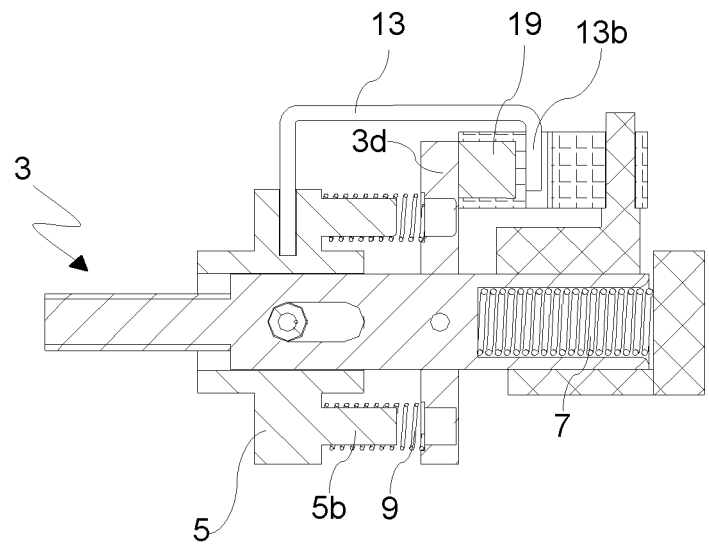
FIG. 6 is a vertical sectional view of the actuator of FIG. 5, taken along the central plane A-A.
Figure 5:
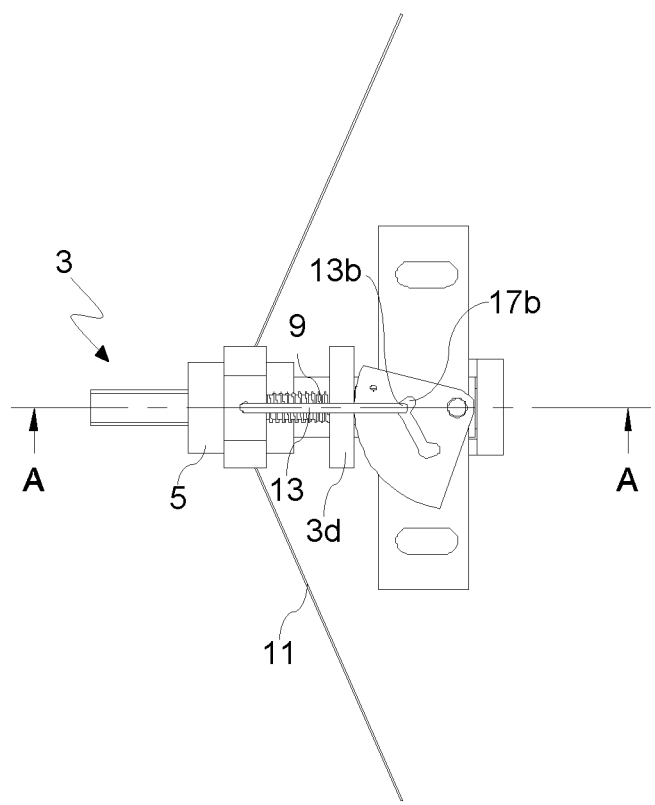
FIG. 5 is a view similar to FIG. 3 of the same actuator at a final moment of a first actuation cycle, with the driving element back to the rest position and the driven element remaining engaged in the operative position.

From the position illustrated in FIGS. 3 and 4, upon deactivation of the SMA wire 11, the actuator reaches the position illustrated in FIGS. 5 and 6 due to the extension of springs 9, supported by pegs 5b, that cause slider 5 to slide back along shutter-carrier 3 which, on the contrary, remains anchored to the rotating member 15 by the engaging means 3d and 19. The return stroke brings slider 5 back to the starting position, but in this case with a mirror-like disposition of bridge 13. In other words, the second bridge end 13b is in the corner facing the second slot end 17b and is not aligned with the first bridge end 13a and with pivot 1c but is rather a little to the left with respect to them, whereby bridge 13 is oriented a few degrees to the left of pivot 1c.

The reverse transition from the operative position of FIGS. 5 and 6 to the rest position of FIGS. 1 and 2 requires another activation of the SMA wire 11 so that it contracts and moves slider 5 forward. This movement results in springs 9 being compressed against disk 3d and in the clockwise rotation (as seen from above in FIG. 7) of the rotating member 15 around pivot 1c due to the push of the second bridge end 13b that engages the second slot end 17b thanks to the orientation of bridge 13. This rotation removes magnet 19 from contact with disk 3d achieving the disengagement of shutter-carrier 3 from the rotating member 15 and thus also from the supporting body 1.

Figure 8:
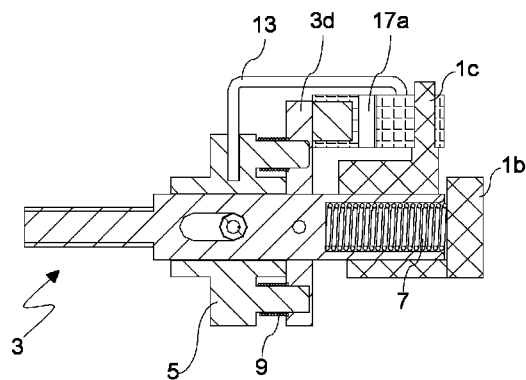
FIG. 8 is a vertical sectional view of the actuator of FIG. 7, taken along the central plane A-A.
Figure 7:
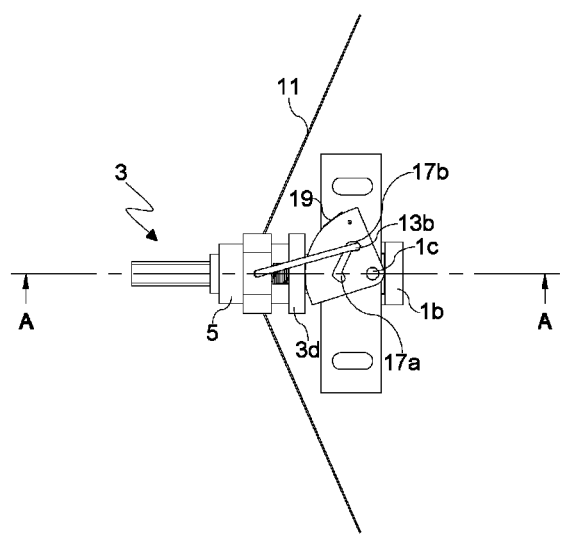
FIG. 7 is a view similar to FIG. 5 of the same actuator at an intermediate moment of a second actuation cycle, with the driving element and the driven element in the operative position and ready to return both to the rest position of FIG. 1 since the driven element is disengaged.

As soon as the disengagement condition illustrated in FIGS. 7 and 8 is reached, either as detected by sensor means or as calculated through the time of activation of the SMA wire 11, the latter is deactivated so that it cools down and re-extends to its original length thus allowing the actuator to return to the rest position illustrated in FIGS. 1 and 2 due to the extension of spring 7. Obviously, also the reaching of this stable rest position can verified by a position sensor.

Talking in general terms, in the above-illustrated arrangement the SMA wire 11 is the actuating member, slider 5 is the driving element, shutter-carrier 3 is the driven element, springs 9 are the first resilient means, spring 7 is the second resilient means and the reversible engagement of the driven element with the supporting body 1 is indirectly achieved through the rotating member 15 by means of magnet 19 that engages disk 3d. The control system that controls this magnetic engagement is made up of bridge 13, rotating member 15 and slot 17 that bring the engaging means 3d and 19 into engagement and then out of engagement.

Figure 9:
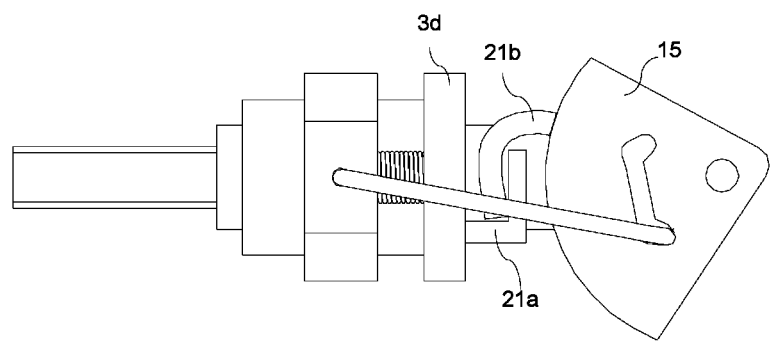
FIG. 9 is a view similar to FIG. 3 of a second embodiment of the actuator, with some elements omitted, which differs from the first embodiment in the engaging means.

FIG. 9 shows a second embodiment of the actuator that differs from the above-described actuator only in the type of engaging means arranged on disk 3d and rotating member 15, namely mechanical means rather than magnetic means. More specifically, a first substantially L-shaped engagement member 21a is provided on disk 3d and a second substantially L-shaped engagement member 21b is provided on the rotating member 15. Said two members 21a, 21b are both arranged in the horizontal plane with their internal sides (i.e. the "concave" sides) facing each other so as to achieve the hooking illustrated in FIG. 9, however it is clear that a suitable engagement could be achieved also with different orientations of members 21a, 21b (even in perpendicular planes) as long as their internal sides face each other.

Figure 10:
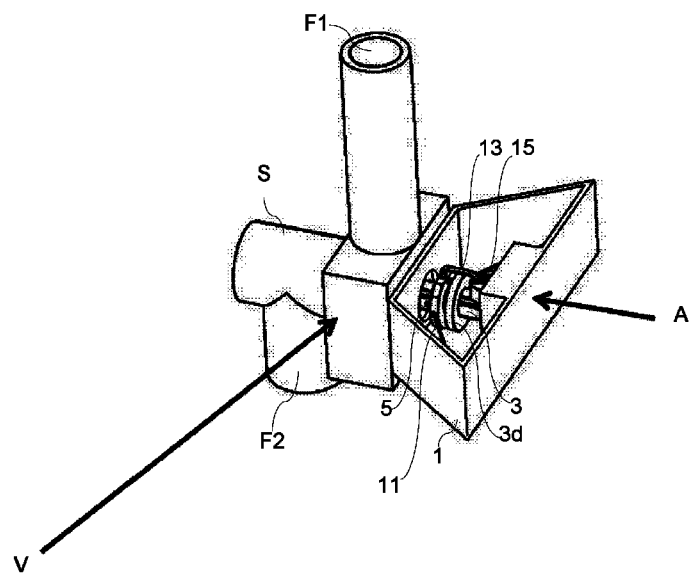
FIG. 10 is a diagrammatic perspective view showing an exemplificative application of the actuator of FIG. 1 to the shutter of a valve.

The actuator operation described above clearly shows how the present actuator achieves the previously mentioned advantages of moving the driven element between two stable positions by activating a single SMA wire only for brief shortening runs, and of having a simple and compact configuration. An example of a possible application of such an actuator is illustrated in FIG. 10, showing an actuator A mounted on a valve V provided with two flow-conveying ducts F1, F2 connected by a shutter case S in which the shutter is moved by shutter-carrier 3 between a closed position and an open position.

As previously mentioned, many modifications can be made to the embodiments described above to obtain further not illustrated embodiments that can differ under one or more aspects. For example, the magnetic engaging means can be changed to simplify the structure of the control system by providing a reversible magnet either as a replacement of the permanent magnet or in combination therewith to obtain an electro-permanent magnet. Since a reversible magnet is a permanent magnet in which the polarization is easily inverted through the application of an electric impulse, it produces an orientable magnetic flux that can also orient the flux of a conventional non-reversible permanent magnet combined therewith, such as to short-circuit the two magnets to deactivate them or to put them in parallel to activate them.

When the magnetic engaging means consist of a permanent magnet, preferably arranged on the driven element, and a reversible magnet, preferably arranged on the supporting body, the magnetic engagement is achieved by setting the polarization of the reversible magnet such that it attracts the permanent magnet. Similarly, when the magnetic engaging means consist of a ferromagnetic member (or a permanent magnet), preferably arranged on the driven element, and an electro-permanent magnet, preferably arranged on the supporting body, the magnetic engagement is achieved by setting the polarization of the reversible magnet such that the electro-permanent magnet is activated and attracts the ferromagnetic member (or permanent magnet).

In both cases the control system for engaging and releasing the magnetic engagement is just the control unit that controls the polarization of the reversible magnet, since the mere reversal of the latter is sufficient to achieve the engagement and disengagement. This also implies that the SMA wire need not be activated to move the magnetic means out of engagement as in the first embodiment illustrated above, whereby bridge 13 and rotating member 15 could even be dispensed with.

Another kind of modification that can be made is aimed at providing more than one operative position, e.g. if the actuator is used on a valve with multiple opening degrees or multiple outlets. In this case a different amount of current is supplied to the SMA wire depending on the position to be reached and therefore on the required degree of contraction of the SMA wire and, correspondingly, engaging means are provided at each of the multiple operative positions. If the stroke required to reach all the different operative positions is excessive for a single SMA wire, further SMA wires can be provided (e.g. each passing through a suitable slider transverse sleeve) to move the driving element according to the needs such that the selection of the SMA wire to be activated depends on the position to be reached.

For example, with reference to the first embodiment described above, the rotating member 15 could take the shape of a cam of progressively reduced radius starting from the central plane A-A and provided with a plurality of magnets 19 along its rear side. Alternatively, with reference to the other embodiments including a reversible magnet, a plurality of magnetic engaging means could be provided on the supporting body along the path traveled by the driven element.

In another alternative embodiment of the present invention, instead of only three or more discrete stable positions, the multistable actuator is to be intended having continuously controlled stable positions located between two end positions. This kind of operation can be obtained, for example, by means of a Pulse Width Modulated (PWM) control signal.

It is therefore clear that the above-described and illustrated embodiments of the shape memory actuator according to the invention are just examples susceptible of various modifications. In particular, in addition to the above-mentioned variants, it should be noted that the control system can be of any other known type, such as those used in retractable pens, as long as it provides the required disengagement of the driven element.

Moreover, the symmetrical arrangement of springs 9, the alignment of the first bridge end 13a with pivot 1c, etc. are preferable for a smooth operation of the actuator but not strictly indispensable, whereby an asymmetrical and/or out-of-alignment arrangement of these elements and/or the elimination of one of them (e.g. using only one spring 9) could be conceived. Similarly, the arrangement of many elements could be reversed with substantial equivalence of operation, e.g. springs 7 and 9 could be arranged to be pulling springs.

Finally, it should also be noted that in the above-described operation of the present actuator directional terms such as vertical/horizontal, left/right, forward/backward, etc. are referred to the specific illustrated embodiment and are not meant to be limitative since the actuator could operate, for example, also upside-down, vertically or with any other particular orientation that a given application might require.

Similarly, despite the fact that the detailed description in this application illustrates the present actuator applied to a valve shutter, this is not intended to limit in any way the possibility of applying said actuator to other devices that can benefit from the features thereof.

The invention claimed is:

1. A shape memory actuator, comprising:
    a supporting body,
    a driven element slidably mounted on said supporting body for movement between a stable rest position and at least one stable operative position,
    a driving element, suitable to drive said driven element, moving between a stable rest position and at least one operative position corresponding respectively to said stable rest position and said at least one stable operative position of the driven element,
    at least one shape memory alloy (SMA) actuating member suitable to provide the movement of said driving element between its rest position and its operative position(s),
    first resilient return means acting in opposition to said SMA actuating member so as to return the driving element to its rest position upon deactivation of the SMA actuating member,
    second resilient return means acting on the driven element and suitable to return the driven element to its rest position upon deactivation of the SMA actuating member,
    engaging means suitable to achieve at the operative position(s) a reversible engagement between the driven element and the supporting body, either directly or indirectly, said engagement being able to resist the action of said second resilient return means, and
    a control system for the engagement and disengagement of said engaging means, said control system including a rotating member pivotally mounted on the supporting body and connected to the driving element through connecting means such that said rotating member can be driven into rotation by the driving element only upon activation of the SMA actuating member but not when the driving element is returned to the rest position upon deactivation of the SMA actuating member, the rotating member being suitable to rotate alternatively clockwise and counter-clockwise at each following activation of the SMA actuating member, a pivoting axis of the rotating member being substantially perpendicular to a sliding axis of the driving element, wherein the means connecting the driving element to the rotating member consist of a substantially inverted U-shaped bridge having a first end pivotally mounted on the driving element with a pivoting axis substantially parallel to the pivoting axis of the rotating member and a second end slidably engaged in a slot formed in the rotating member and shaped such that ends of the slot are located at different angular positions relative to the pivoting axis of the rotating member in a plane perpendicular thereto.

2. The shape memory actuator according to claim 1, wherein the rotating member is substantially shaped like a circular sector.

3. The shape memory actuator according to claim 1 wherein the engaging means consist of a first engagement member arranged on the driven element and a second engagement member arranged on the rotating member, such that the rotation of the latter in a first direction brings said engagement members into engagement and the following rotation in the opposite direction causes their disengagement.

4. The shape memory actuator according to claim 3, wherein the engagement members are substantially L-shaped members arranged with their internal sides facing each other.

5. The shape memory actuator according to claim 1 wherein the driving element is slidably and coaxially mounted on the driven element or slidably mounted parallel thereto.

6. The shape-memory actuator according to claim 5, wherein the SMA actuating member passes through a transverse sleeve of the driving element, said transverse sleeve being slidably received in a longitudinally extending horizontal slot formed in the driven element.

7. The shape memory actuator according to claim 1, wherein the first resilient return means consist of one or more coiled springs arranged between the driving element and the driven element.

8. The shape memory actuator according to claim 1, wherein the second resilient return means consist of one or more coiled springs arranged between the supporting body and the driven element.

9. The shape memory actuator according to claim 1, wherein at least one of the engaging means is magnetic means.

10. The shape memory actuator according to claim 9, wherein the engaging means consist of a permanent magnet and a ferromagnetic member or another permanent magnet of opposite polarization.

11. The shape memory actuator according to claim 9, wherein the engaging means consist of an electro-permanent magnet and a ferromagnetic member, and in that the control system consists of a control unit for the activation and deactivation of said electro-permanent magnet.

12. The shape memory actuator according to claim 9, wherein the engaging means consist of a reversible magnet and a permanent magnet, and in that the control system consists of a control unit for the reversal of said reversible magnet.

13. The shape memory actuator according to claim 1, wherein it further includes sensor means suitable to detect the engagement condition of the engaging means or the movement of the driven element, said sensor means being operatively connected to a control unit for the activation and deactivation of the SMA actuating member.

14. The shape memory actuator according to claim 13, wherein the sensor means include at least one Hall effect sensor.

15. The shape memory actuator according to claim 1, wherein the SMA actuating member is mounted on the supporting body through resilient means suitable to absorb the contraction of the SMA actuating member in order to serve as a mechanical safety that prevents the rupture of the SMA actuating member in case the driving element and/or the driven element cannot be moved.

16. A valve including a shutter movable between a stable rest position and at least one stable operative position under the action of an actuator wherein said actuator is the shape memory actuator according to claim 1.

17. The shape memory actuator according to claim 1, wherein the pivoting axis of the rotating member is coplanar with the sliding axis of the driving element.

18. The shape memory actuator according to claim 1, wherein the pivoting axis of the means connecting the driving element to the rotating member is coplanar with the pivoting axis of the rotating member.

* * * * *